United States Patent
Kopecek et al.

(10) Patent No.: US 8,490,381 B2
(45) Date of Patent: Jul. 23, 2013

(54) SYSTEMS INVOLVING FIBER OPTIC IGNITERS TRANSMITTING FUEL AND LASER LIGHT

(75) Inventors: Herbert Kopecek, Hallbergmoos (DE); Johannes Eckstein, Ismaning (DE); Craig Douglas Young, Maineville, OH (US)

(73) Assignee: General Electric Company, Niskayuna, NY (US)

( * ) Notice: Subject to any disclaimer, the term of this patent is extended or adjusted under 35 U.S.C. 154(b) by 142 days.

(21) Appl. No.: 13/230,871

(22) Filed: Sep. 13, 2011

(65) Prior Publication Data

US 2012/0000178 A1    Jan. 5, 2012

Related U.S. Application Data

(62) Division of application No. 12/122,263, filed on May 16, 2008, now abandoned.

(51) Int. Cl.
*F02C 7/264* (2006.01)
(52) U.S. Cl.
USPC .......... 60/39.821; 123/143 B; 385/123
(58) Field of Classification Search
USPC .... 60/39.821–828; 123/143 B; 385/123–129, 385/132
See application file for complete search history.

(56) References Cited

U.S. PATENT DOCUMENTS

| | | | |
|---|---|---|---|
| 4,947,640 A | 8/1990 | Few et al. | |
| 5,367,869 A * | 11/1994 | DeFreitas | 60/776 |
| 5,628,180 A * | 5/1997 | DeFreitas | 60/776 |
| 5,845,480 A | 12/1998 | DeFreitas et al. | |
| 6,053,140 A * | 4/2000 | Feichtinger et al. | 123/143 B |
| 6,343,174 B1 * | 1/2002 | Neuberger | 385/123 |
| 6,367,869 B1 | 4/2002 | Baccouche et al. | |
| 6,514,069 B1 * | 2/2003 | Early et al. | 431/1 |
| 7,404,395 B2 * | 7/2008 | Yoshimoto | 123/538 |
| 7,618,254 B2 * | 11/2009 | Gartz | 431/6 |
| 2007/0068475 A1 * | 3/2007 | Kopecek et al. | 123/143 B |
| 2009/0044776 A1 * | 2/2009 | Klausner et al. | 123/143 B |
| 2009/0282805 A1 * | 11/2009 | Kopecek et al. | 60/39.828 |

OTHER PUBLICATIONS

Stakhiv et al., Laser Ignition of Engines via Optical Fibers?, Laser Physics, vol. 14, No. 5, 2004, pp. 738-747.*

* cited by examiner

*Primary Examiner* — Phutthiwat Wongwian
*Assistant Examiner* — Lorne Meade
(74) *Attorney, Agent, or Firm* — Penny A. Clarke

(57) ABSTRACT

A gas turbine engine system comprising, a gas turbine engine including a combustion area, a laser, a fuel nozzle including an optical fiber operative to transmit light emitted from the laser to the combustion area, the optical fiber also transmitting a fuel into the combustion area, wherein the light is operative to ignite the fuel in the combustion area.

6 Claims, 6 Drawing Sheets

SYSTEMS INVOLVING FIBER OPTIC IGNITERS TRANSMITTING FUEL AND LASER LIGHT

This application is a divisional application of, and claims priority to non-provisional application Ser. No. 12/122,263, filed on 16 May 2008, the entire contents of which are hereby incorporated by reference.

BACKGROUND OF THE INVENTION

The present disclosure relates generally to systems involving igniting fuel, and more particularly to systems involving igniting fuel with light from a fiber optic system.

Engines that use combustible fuel such as, for example, gas turbine engines and internal combustion engines include combustion areas such as, for example, combustors or cylinder and piston assemblies that facilitate the conversion of energy from combustion into mechanical energy. Fuel nozzles are used to introduce atomized fuel into the combustion areas. The atomized fuel is ignited by an igniter. Igniters may include, for example, electrical igniters that create a spark proximate to the atomized fuel, heating elements that introduce heat to the atomized fuel, and igniters that introduce a flame in the combustion area.

For turbine applications, igniters are typically based on electrical discharge. Electrical discharge igniters need much more space inside the combustion chamber. The electrodes cannot be placed inside the cone of the fuel spray since the droplets would lead to strong deposits on the electrodes and thus reduce the durability of the igniter. High spark energies, which are needed for successful ignition, also significantly reduce the lifetime of the igniter.

Accordingly, there is a need for improved igniters where space is limited such as may be the case with turbine applications.

BRIEF DESCRIPTION OF THE INVENTION

An exemplary embodiment includes a gas turbine engine system comprising, a gas turbine engine including a combustion area, a laser, a fuel nozzle including a cavity operative to transmit a fuel into the combustion area, and an optical fiber engaging the cavity, operative to transmit light emitted from the laser to the combustion area, wherein the light is operative to ignite the fuel in the combustion area.

An alternate exemplary embodiment includes a system for igniting combustible fuel comprising, a laser, and an optical fiber partially defining a first channel and a second channel, wherein the first channel is operative to transmit light emitted from the laser to a combustion area, and the second channel is communicative with a fuel source and the combustion area and is operative to introduce fuel from the fuel source into the combustion area.

Another alternate exemplary embodiment includes a system for igniting combustible fuel comprising, a laser, and an optical fiber partially defining a channel communicative with a fuel source and a combustion area and operative to introduce fuel from the fuel source into the combustion area, wherein the channel is further operative to transmit light emitted from the laser to the combustion area and the light is operative to ignite the fuel.

BRIEF DESCRIPTION OF THE DRAWINGS

These and other features, aspects, and advantages will become better understood when the following detailed description is read with reference to the accompanying drawings in which like characters represent like parts throughout the drawings, wherein.

DETAILED DESCRIPTION OF THE INVENTION

In the following detailed description, numerous specific details are set forth in order to provide a thorough understanding of various embodiments. However, the embodiments may be practiced without these specific details. In other instances, well known methods, procedures, and components have not been described in detail.

Further, various operations may be described as multiple discrete steps performed in a manner that is helpful for understanding the embodiments. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

In one embodiment, laser light is used to create heat in a fuel, or may be focused to create a micro-spark so as to initiate the combustion of fuel in a combustion area.

Figure 1:
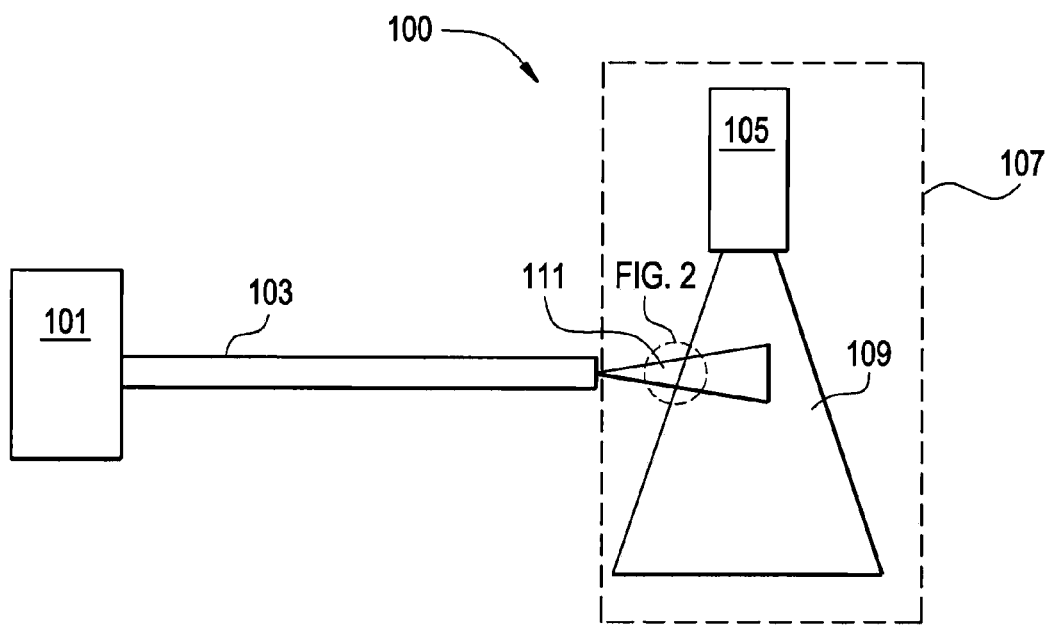
FIG. 1 illustrates of an exemplary embodiment of a system for igniting combustible fuel.
Figure 2:
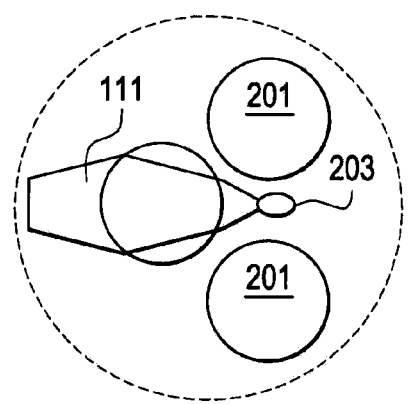
FIG. 2 illustrates of an exemplary portion of light from the system of FIG. 1.

FIG. 1 illustrates a diagram of an optical fuel igniter system 100. The optical fuel igniter system 100 includes a laser source 101 in optical communication with one end of an optical fiber 103. The other end of the optical fiber is in optical communication with a fuel. Generally, the fuel is injected into a combustion area by means of fuel nozzle 105. The laser source is configured to generate light at a wavelength and power effective to be absorbed by the fuel and ignite the fuel, or alternatively, cause a microspark within the fuel to occur. The laser light is focused at about an area within a combustion area 107 where the fuel will flow. The fuel is not intended to be limited to any particular type or kind so long s it is combustible. For example, the fuel can be a gas or liquid, In operation, the fuel nozzle 105 receives fuel from a fuel source (not shown) and emits the fuel into a combustion area 107. The fuel may be emitted as atomized fuel 109 such that the fuel may be easily combusted. The laser 101 emits a light 111 that is transmitted by the optical fiber 103. When the light 111 enters the atomized fuel 109, the atomized fuel 109 combusts. FIG. 2 illustrates two examples of the interaction of the light 111 with the atomized fuel 109 that may cause the atomized fuel to combust. FIG. 2 includes fuel droplets 201 and light 111. The light 111 may be absorbed by the fuel droplets 201 causing the temperature of the fuel droplets 201 to increase. If the increase in the temperature of the fuel droplets 201 reaches an ignition temperature of the fuel droplets 201, the droplets will combust. Another cause of combustion may be a micro-spark. As the light 111 passes through a fuel droplet 201, it may become focused such that a microspark 203 results. The micro-spark may cause the fuel droplets 201 to combust. Optics (not shown) that include, for example a lens, or a number of lenses may also be used to focus the light 111 and create the micro-spark 203. Examples of lasers that may be used for the laser 101 include, but are not limited to Neodymium-type lasers, Erbium-type lasers or any other solid state lasers. Semiconductor lasers may also be used as for the laser 101.

Figure 3:
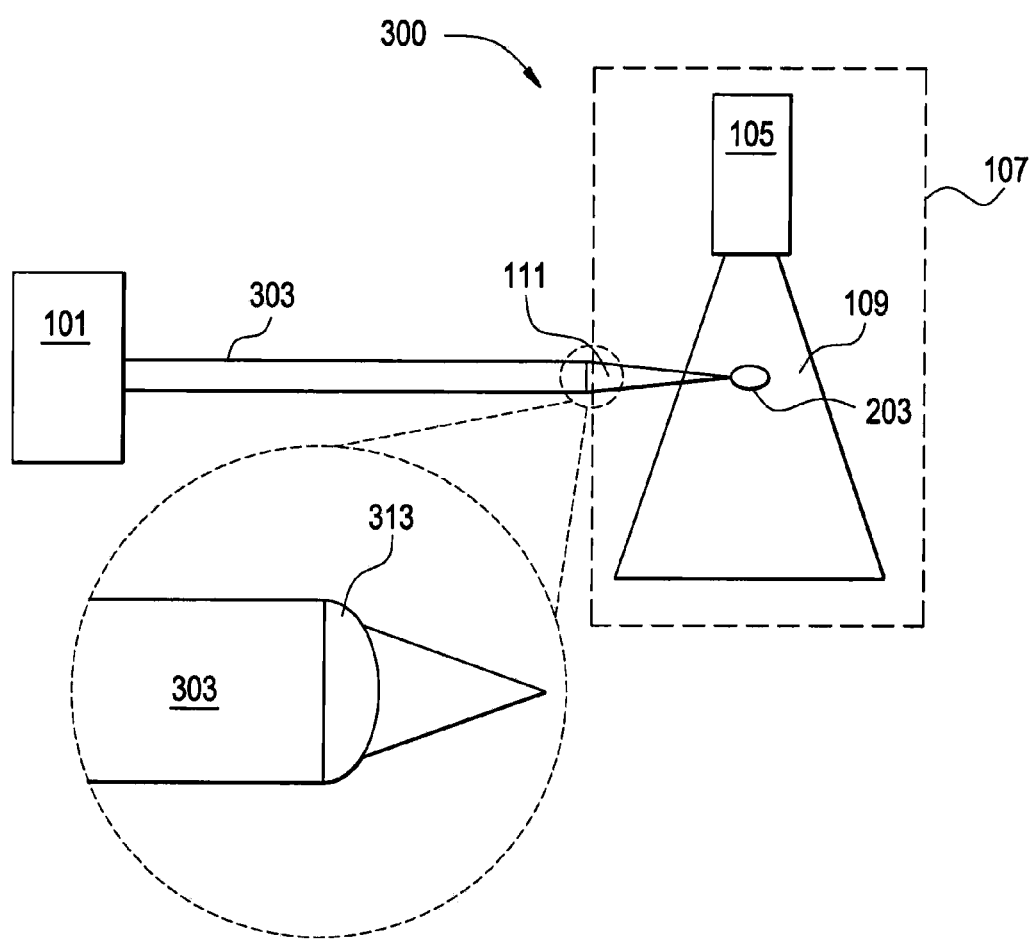
FIGS. 3-7 illustrate alternate exemplary embodiments of the system for igniting combustible fuel.

FIG. 3 illustrates an alternate embodiment of an optical fuel igniter system 300. The optical fuel igniter system 300 is similar to the optical fuel igniter system 100 of FIG. 1, however optical fuel igniter system 300 includes an optical fiber 303 that has an distal portion 313 that has a convex shape. The convex shape of the distal portion 313 focuses the light 111 causing a micro-spark 203 in the atomized fuel 109.

Figure 4:
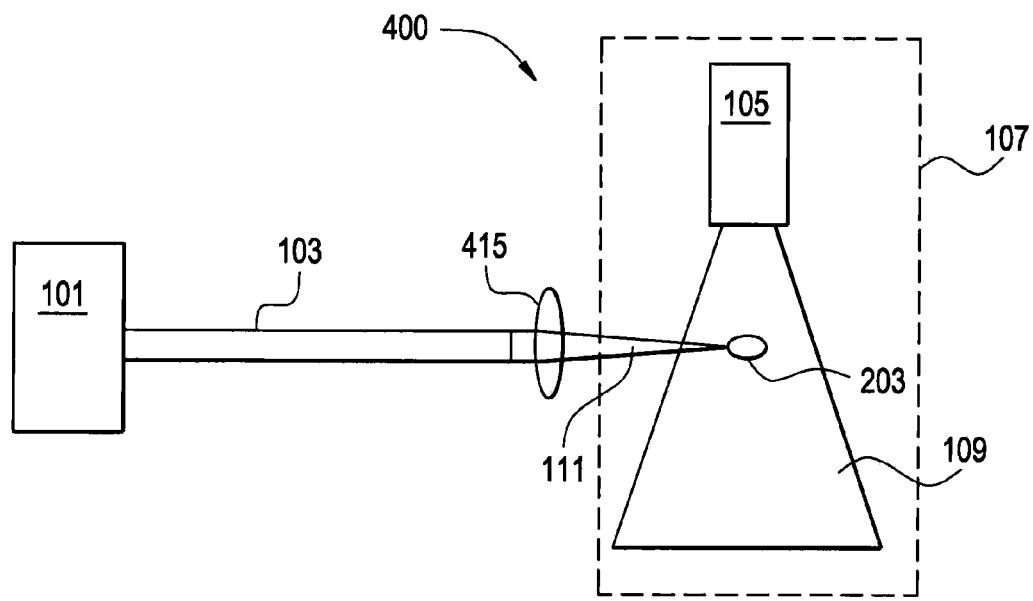

FIG. 4 illustrates an alternate embodiment of an optical fuel igniter system 400. The an optical fuel igniter system 400 is similar to the an optical fuel igniter system 100, and includes an optics portion 415 comprising, for example, a lenses, a number of lenses, or similar devices that focus light. The optics portion 415 is disposed between the optical fiber 103 and the combustion area 107. The optics portion 415 focuses light emitted from the optical fiber such that a micro-spark 203 is created in the atomized fuel 109.

Figure 5:
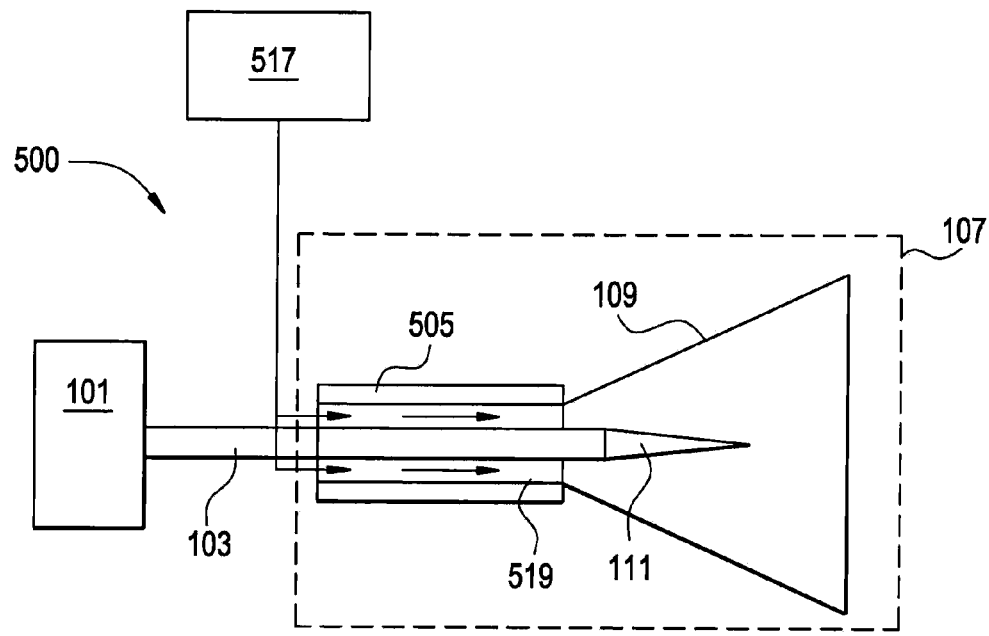

FIG. 5 illustrates an alternate exemplary embodiment of an optical fuel igniter system 500. In the illustrated embodiment a fuel nozzle 505 includes a cavity 519. The cavity 519 is engaged by the optical fiber 103. In operation, the fuel nozzle receives fuel from a fuel source 517, and emits the fuel into the combustion area 107 via the cavity 519. The optical fiber 103 transmits light 111 from the laser 101 into the combustion area 107 to ignite the atomized fuel 109 in the combustion area 107. The optical fiber 103 may also be convex shaped similar to the tip 313 of FIG. 3. In some embodiments, the optics portion 415 may also be disposed in the path of the light 111 to focus the light 111.

Figure 6:
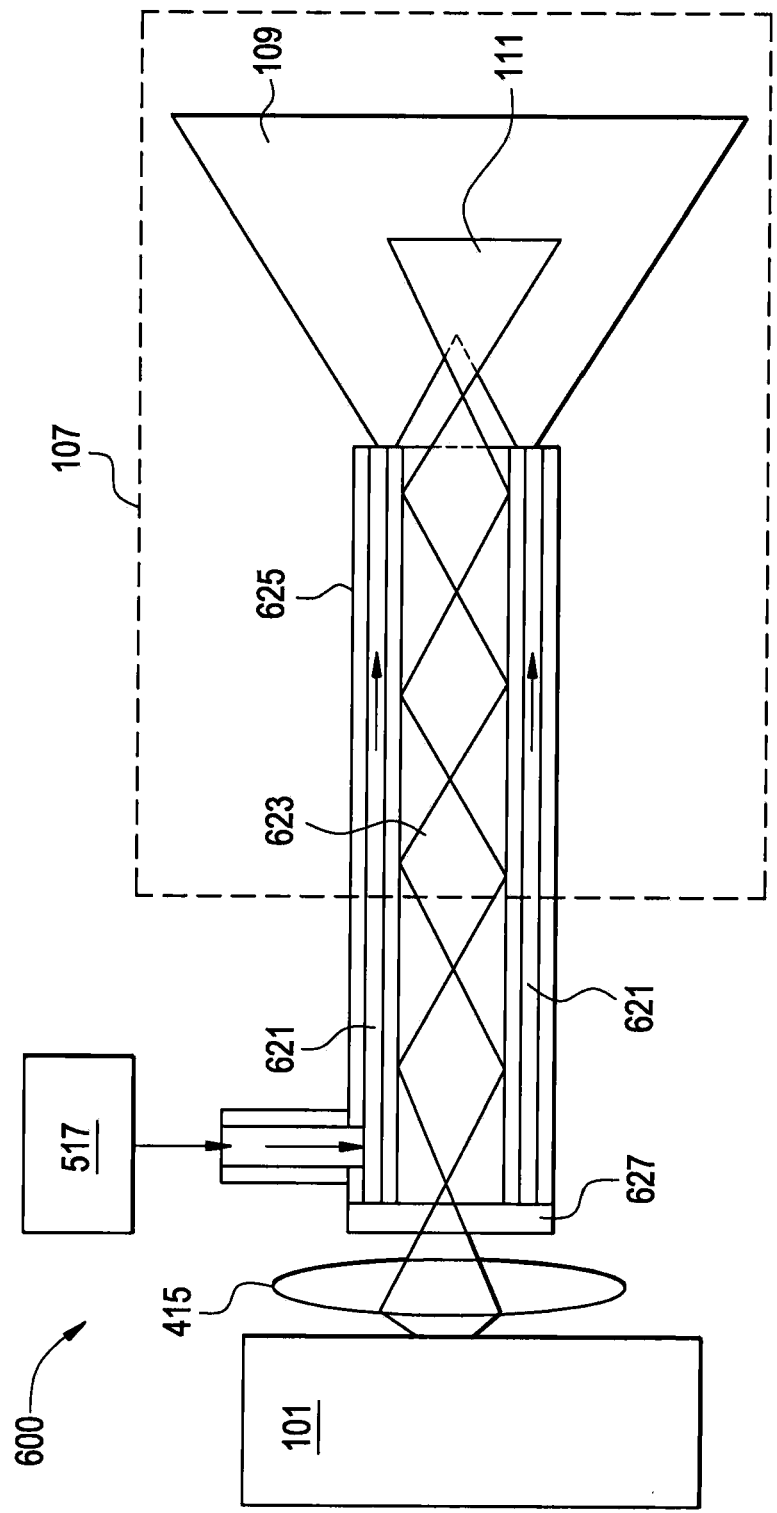

FIG. 6 illustrates an alternate embodiment of an optical fuel igniter system 600. The illustrated embodiment includes the laser 101, the optics 415, the fuel source 517, the combustion area 107, an end member 627, and an optical fiber 625 having a first channel 623 and a second channel 621. The optical fiber 625 may be, for example, a photonic crystal fiber, or other types of optical fibers that have a number of channels. The end member is disposed on an end of the optical fiber 625. In operation, fuel is received from the fuel source 517 and emitted into the combustion area 107 as atomized fuel 109 via the second channel 621. The laser 101 emits light 111 that may be focused with the optics 415 such that the light 111 causes the atomized fuel 109 to combust. The illustrated embodiment shows a single second channel 621, however other embodiment may include a plurality of channels similar to the second channel 621 that may carry fuel from the fuel source 517 to the combustion area 107. The end member 627 may be transparent or semitransparent. The end member 627seals the first channel 623 and the second channel 621 such that fuel flows towards the combustion area 107. The optical fiber 103 may also be convex shaped similar to the tip 313 of FIG. 3. In some embodiments, the optics portion 415 may also be disposed in the path of the light 111 to focus the light 111.

Figure 7:
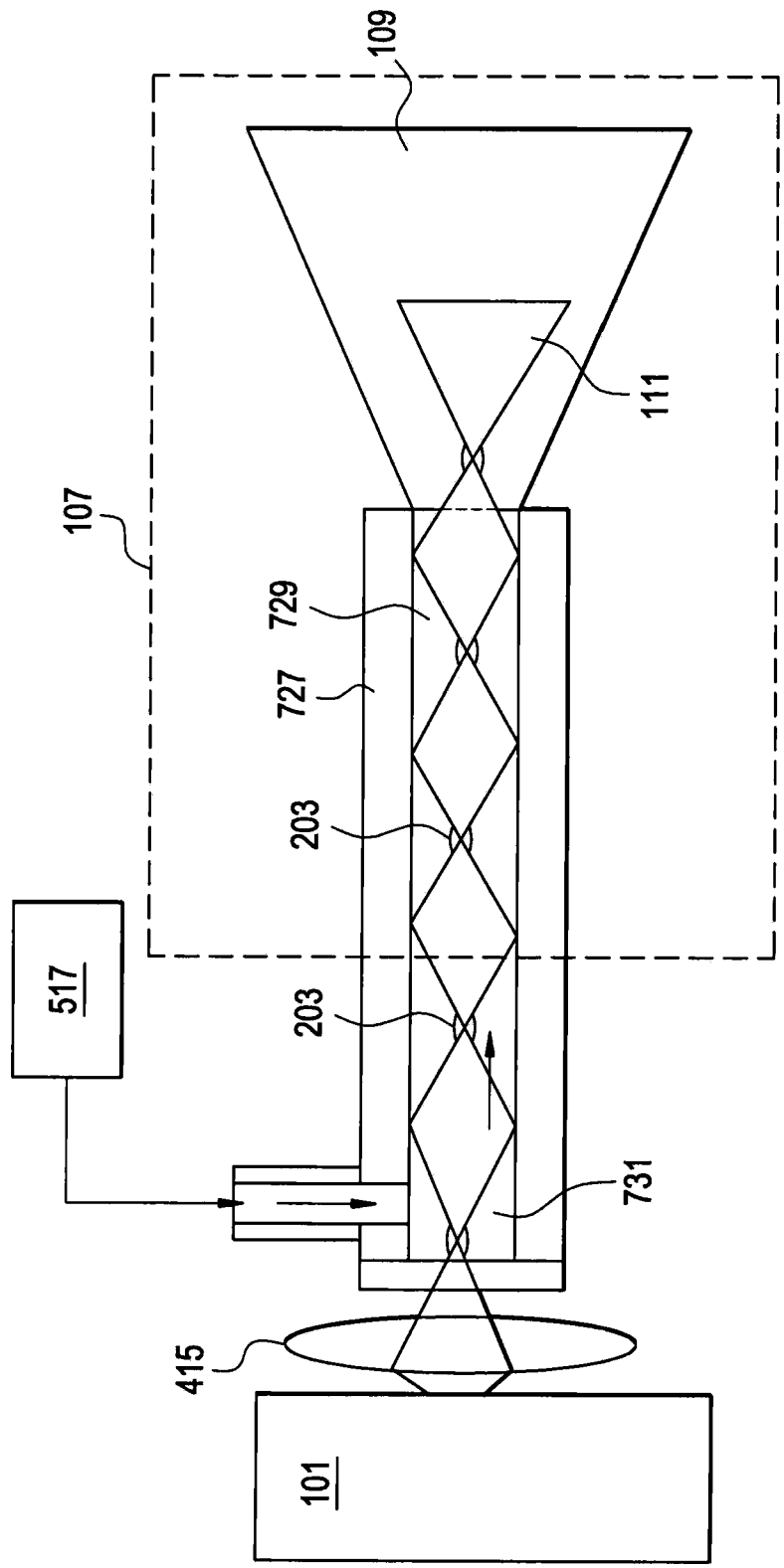

FIG. 7 illustrates an alternate embodiment of an optical fuel igniter system 700. The optical fuel igniter system 700 includes a hollow core fiber 727 having a channel 729. The hollow core fiber 727 may be, for example, a fiber having a channel with a high reflection coating on the surface of the channel 729 and hollow core photonic crystal fibers. In operation, fuel 731 from the fuel source 517 enters the channel 729. Light 111 enters the channel 729 after it has been focused by the optics 415. In alternate embodiments, and the light 111 may enter the channel 729 without the optics 415 disposed between the laser 101 and the hollow core fiber 727. The focused light 111 in the channel 729 causes the micro-spark 203 in the channel 729. The micro-spark 203 ignites the fuel 731 in the channel 729, causing a flame (not shown) to exit the channel 729 and ignite atomized fuel in the combustion area 107. The optical fiber 103 may also be convex shaped similar to the tip 313 of FIG. 3. In some embodiments, the optics portion 415 may also be disposed in the path of the light 111 to focus the light 111.

Figure 8:
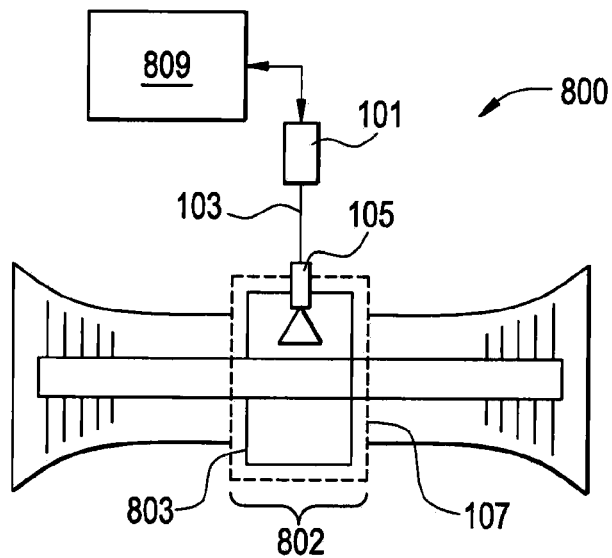
FIG. 8 illustrates another alternate exemplary embodiment of the system for igniting combustible fuel including a gas turbine engine.

FIG. 8 illustrates a side partially cut-away view of an exemplary embodiment of a gas turbine engine system 800 that includes a combustor section 803 that partially defines the combustion area 107. An optical fuel igniter system 802 including the fuel nozzle 105, the laser 101, and the optical fiber 103 may be similar to any of the embodiments of the optical fuel igniter system described above. The gas turbine engine system 800 also includes a controller 809 that is operative to control the optical fuel igniter system 802.

In some embodiments components of the optical fuel igniter system 802 may be located in a remote location from the gas turbine engine such as, for example, the controller 809 and the laser 101 may be located in an integrated electronic control unit (not shown).

In operation, compressed air enters the combustion area 107 and is mixed with fuel from the fuel nozzle 105. The fuel-air mixture is ignited by light from the laser 101 via the optical fiber 103 as described in the embodiments above. The resultant expanding gas exits the combustion area 107 and is converted into mechanical power.

FIGS. 1-7 illustrate embodiments of a fuel nozzle that may, for example, be used as a main fuel nozzle for the combustion area 107. Alternatively, the embodiments described above may be used as pilot nozzles that are operative to ignite fuel in the combustion area 107. If used as a pilot nozzle, the embodiments may, for example, receive fuel from a separate fuel supply line that services the pilot nozzle.

Figure 9:
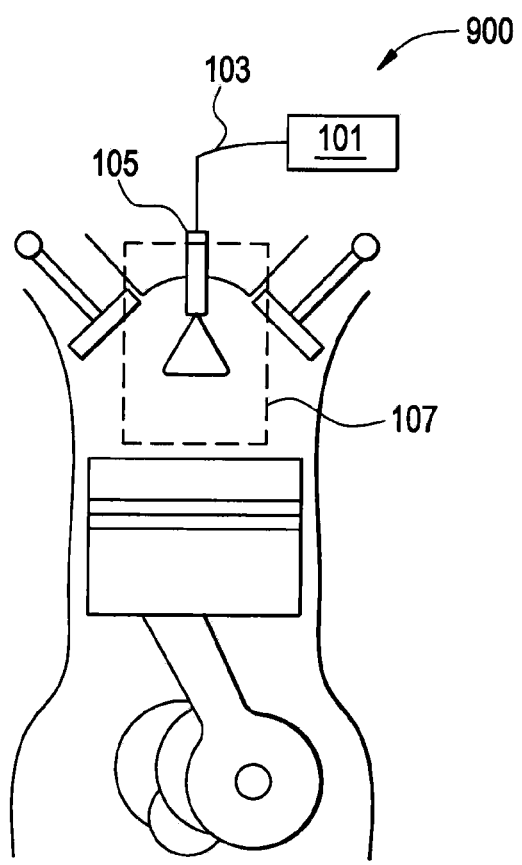
FIG. 9 illustrates another alternate exemplary embodiment of the system for igniting combustible fuel including an internal combustion engine.

FIG. 9 illustrates a side partially cut-away view of an exemplary embodiment of an internal combustion engine system 900 that includes an optical fuel igniter system having the combustion area 107, the fuel nozzle 105, the laser 101, and the optical fiber 103. The internal combustion engine system 900 may be similar to any of the embodiments of the optical fuel igniter system described above.

This written description uses examples to disclose the embodiments, including the best mode, and also to enable practice of the embodiments, including making and using any devices or systems and performing any incorporated methods. The patentable scope of the embodiments is defined by the claims, and may include other examples. Such other examples are intended to be within the scope of the claims if they have structural elements that do not differ from the literal language of the claims, or if they include equivalent structural elements with insubstantial differences from the literal languages of the claims.

What is claimed:

1. A system for igniting combustible fuel comprising:
   a laser; and
   an optical fiber partially defining a first channel and a second channel, wherein the first channel is operative to transmit light emitted from the laser to a combustion area, and the second channel is communicative with a fuel source and the combustion area and is operative to introduce fuel from the fuel source into the combustion area.

2. The system of claim 1, wherein the system further comprises an end member disposed on a distal portion of the optical fiber proximate to the laser.

3. The system of claim 1, wherein the system further comprises an optics portion disposed between the laser and the optical fiber, the optics portion operative to focus the light.

4. The system of claim 1, wherein the system optical fiber comprises a photonic crystal.

5. The system of claim 1, wherein the system further comprises a gas turbine engine.

6. The system of claim 1, wherein the system further comprises an internal combustion engine.

\* \* \* \* \*